Patented Jan. 28, 1941

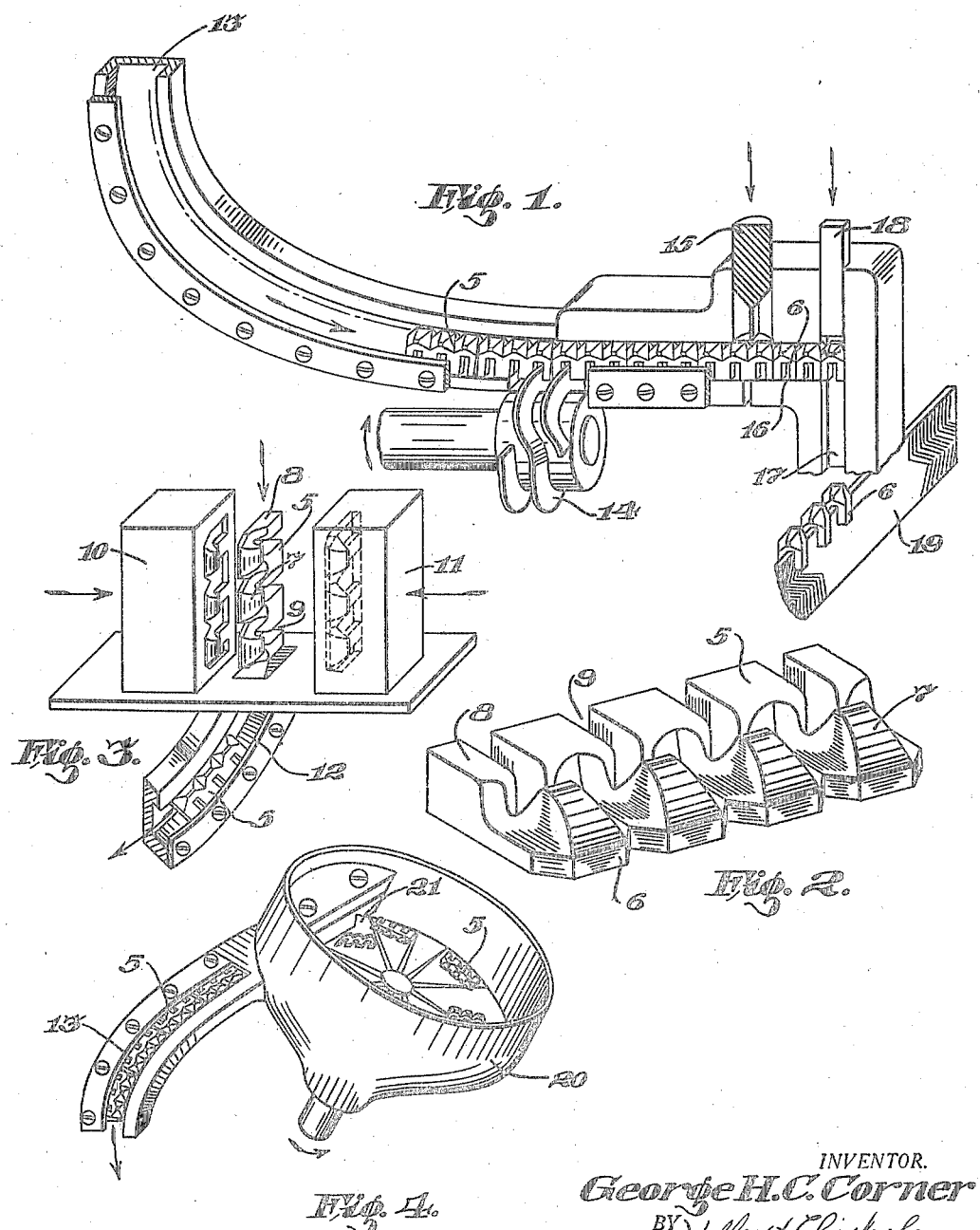

2,229,998

UNITED STATES PATENT OFFICE 2,229,998

METHOD OF MAKING FASTENERS

George Henry Clifford Corner, Sutton Coldfield, England, assignor to Talon, Inc., a corporation of Pennsylvania Application May 13, 1938, Serial No. 207,728
In Great Britain June 7, 1937

4 Claims. (Cl. 18—59)

This invention relates to the manufacture of fasteners of the well known type in which series of fastener members are secured to two mounting tapes and the stringers thus formed are brought into interlocking engagement by a slider mounted on the said fastener stringers.

In the manufacture of fasteners of the kind described, one method is to produce individual fastener members by a pressing operation or the like, said individual members, when formed, being fed one by one to a machine where the members are attached to the mounting tape. An alternative method is to manufacture the members connected side by side in the form of a strip, for example, by a die-casting or injection molding operation or by machining from a strip of non-metallic material. When working according to the last method comparatively long lengths of fastener members may be produced which may be fed easily to an assembling machine, but when the strips are formed by a casting or molding operation it is difficult to obtain long strips of finished or partly finished fastener members, since the part of the mold remote from the injection nozzle or nozzles is starved of material and the members at the ends are, therefore, imperfect.

It is the object of my invention to provide an improved method of manufacture of separable fasteners of the kind described by means of a die-casting or injection molding operation.

In the accompanying drawing I have shown for purposes of illustration, one embodiment which my invention may assume in practice. In the drawing:

Fig. 1 is a schematic view showing a method for making fasteners in accordance with my invention;

Fig. 2 is a perspective view of one of the short strips of fastener elements used in my invention;

Fig. 3 is a schematic view showing the method of molding the short strips;

Fig. 4 is a schematic view of a hopper which is an alternative method of feeding the short strips to a guideway.

My invention deals with what I shall term "short strips" of fastener members. By the use of the term "short strip" I intend to cover a plurality, at least two and not more than a sufficient number of members to make a strip of about three or four inches long. Preferably these short strips will have only three to six fastener members. In the drawing, the strip is generally designated by the numeral 5, and each individual fastener member by the numeral 6. The specific form of these fastener members is not new and the one illustrated follows a well known commercial shape in which the element has an interlocking head 7, and a tape receiving end 8 provided with a slot 9. The fastener members are arranged side by side in the strip and are, of course, integrally joined together.

While the method of manufacturing fastener stringers according to the invention is of general application where it is desired to feed short lengths of fastener member to an assembling machine, it is particularly relevant to the case in which rows of fastener members are formed by a casting operation, either a die-casting or injection molding operation, and particularly when such rows of fastener members are formed, by a molding operation, from non-metallic materials.

As shown schematically, the strip 5 may be formed between opposed mold parts 10, 11, the molding material being fed into the mold in any suitable manner such as by injection. When the mold is open suitable arrangements may be provided for ejecting the strip 5 directly into the chute or guideway 12.

The assembling machine for affixing the fastener members to the mounting tapes can, of course, be of any known type, but where the invention is applied to rows of fastener members made by a molding operation from non-metallic materials, the assembling machine described in British Patent No. 444,405 for example, is particularly applicable. Such a machine is shown schematically in Fig. 1 and may comprise a guideway or chute 13 in which the strips are fed end to end. The feeding is stepwise and is a distance equivalent to one individual fastener element and is accomplished by any suitable means such as the cam 14 engaging in the slots 9. Suitable means is provided for severing the individual fastener members apart such as a reciprocating cutter 15. When this cutter comes to an end of one of the short strips it will merely reciprocate idly since the fastener elements are already separated at that point. The severed fastener members proceed along the continuation 16 of the chute and come to the channel 17, where they are pushed by suitable means such as the punch 18 into engagement with the tape 19. The tape is fed stepwise in properly timed relation with the other parts of the mechanism.

As heretofore stated, the short strips may be placed in the chute 13 either by hand, automatically as suggested in Fig. 3, or they may be fed from bulk by means of a suitable centrifugal hopper 20 from which they pass into the chute from a properly designed gate 21.

By employing the method of manufacture according to my invention in this way, short lengths of three or more fastener members such as would be formed, for example, by an injection molding operation from non-metallic materials, may be dealt with in a manner requiring the minimum of supervision and a reduced number of intermediate operations. While the employment of rows of fastener members formed by an injection molding operation is specifically mentioned, it will be understood that rows of fastener members formed in any other manner may equally well be employed, and I do not limit my invention to the use of rows of fastener members formed from non-metallic materials, since it is applicable also to rows of metallic members formed in any known manner when it is desired to supply a plurality of short lengths of such fastener members to an assembling machine for attachment to a mounting tape.

I claim:

1. The method of making fastener stringers of the class described which comprises forming short strips of integrally connected fastener members in side by side relation, each end of the strip constituting a finished side surface of a fastener member, feeding such strips in end to end relation to an assembling apparatus, severing the short strips into individual fastener members, and assembling the severed members with a tape without interruption between strips.

2. The method of making fastener stringers of the class described, which consists of molding short strips of fastener members, each end of the strip constituting a finished surface of a fastener member, feeding the same to an assembling apparatus in end to end relation, cutting the short strips apart to provide individual fastener elements, and placing the fastener members in properly arranged relation on a tape without interruption between strips.

3. The method of making fastener stringers of the class described, which consists of molding short strips of fastener members, each end of the strip constituting a finished surface of a fastener member, feeding the short strips from bulk to a chute in end to end relation, the fastener members in all of the strips having the same orientation, conducting the members from the chute to an assembling apparatus, cutting the short strips to divide the same into separate fastener members, and placing the fastener members in properly arranged relation on the tape without interruption between strips.

4. The method defined in claim 3 in which each short strip consists of three to six integral fastener members in side by side relation.

GEORGE HENRY CLIFFORD CORNER.